United States Patent [19]

Chansavoir et al.

[11] Patent Number: 5,845,408
[45] Date of Patent: Dec. 8, 1998

[54] CONTOUR READING DEVICE, IN PARTICULAR FOR EYEGLASS LENSES

[75] Inventors: Alain Chansavoir, Montmorency; Christian Joncour, Saint Maurice, both of France

[73] Assignee: Essilor International Compagnie Generale d'Optique, Charenton le Pont, France

[21] Appl. No.: 785,603

[22] Filed: Jan. 17, 1997

[30] Foreign Application Priority Data

Jan. 17, 1996 [FR] France .................. 96 00487

[51] Int. Cl.⁶ .................................... G01B 11/03
[52] U.S. Cl. .................................... 33/200; 33/549
[58] Field of Search .................... 33/189, 200, 507, 33/533, 549, 545, 546, 547, 555

[56] References Cited

U.S. PATENT DOCUMENTS

| | | | |
|---|---|---|---|
| 4,571,842 | 2/1986 | Ikezawa et al. | 33/200 |
| 5,097,600 | 3/1992 | Brule et al. | 33/507 |
| 5,121,550 | 6/1992 | Wood et al. | 33/507 |
| 5,138,770 | 8/1992 | Matsuyama | 33/507 |
| 5,152,067 | 10/1992 | Kurachi et al. | 33/200 |

FOREIGN PATENT DOCUMENTS 2634-880-A  2/1990  France ................ 33/200

*Primary Examiner*—G. Bradley Bennett
*Attorney, Agent, or Firm*—Young & Thompson

[57] ABSTRACT

A contour reading device, in particular for eyeglass frames, includes a holding arrangement to support a template at a fixed position and a carriage mobile relative to the holding arrangement and carrying a feeler at the end of a rod. To read off the position of a mounting hole in a peripheral area of the template, the device includes a detector arrangement having at least one component constrained to move with the carriage at a given distance from the axis of the rod carrying the feeler, on the same side as a central area of the holding means. Applications include identifying the mounting holes in "drilled mount" eyeglass lenses.

15 Claims, 1 Drawing Sheet

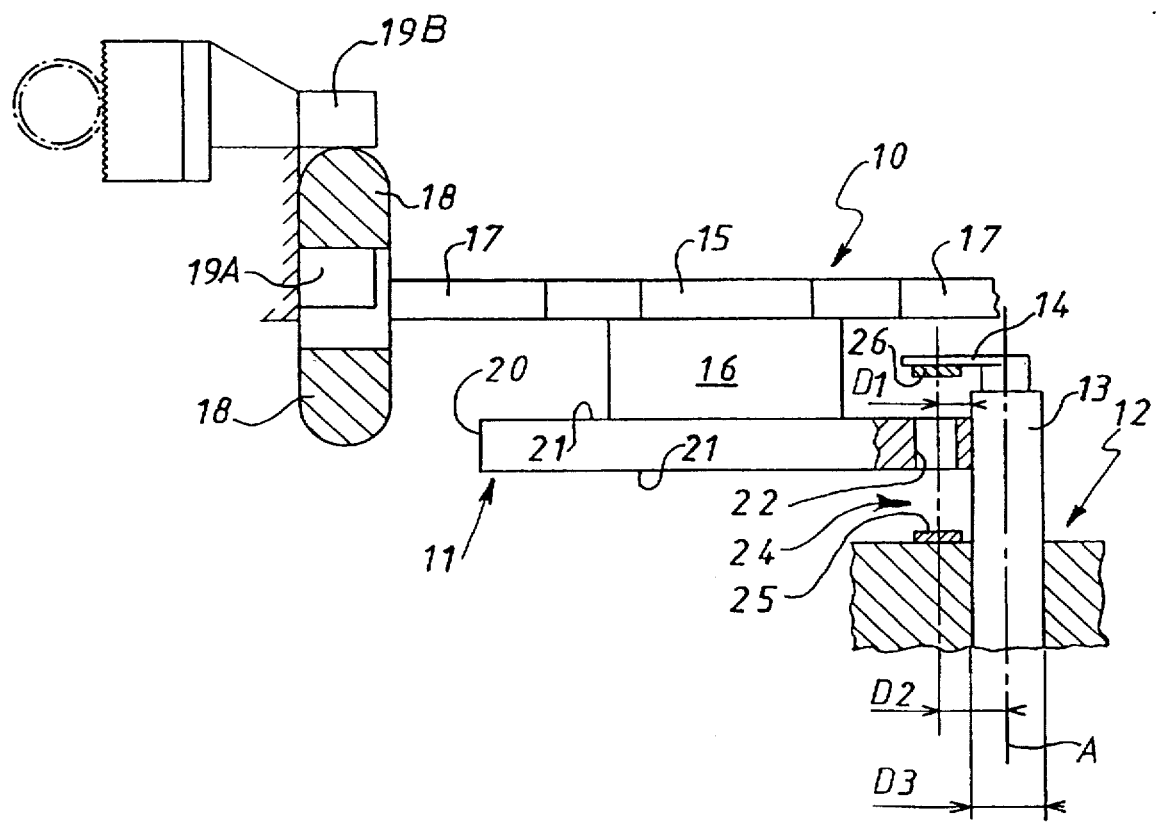

CONTOUR READING DEVICE, IN PARTICULAR FOR EYEGLASS LENSES

BACKGROUND OF THE INVENTION

1. Field of the Invention

The present invention is generally concerned with contour reading devices of the kind including holding means adapted to support the article whose contour is to be read off at a fixed position and a carriage mobile relative to the holding means carrying a feeler at the end of a rod and adapted to contact the article.

2. Description of the Prior Art

A contour reading device of this kind is described in U.S. Pat. No. 5,121,548.

In the case of a reading to enable subsequent trimming of an eyeglass frame to its final contour, the article whose contour is to be read is the eyeglass frame to which the lens is to be fitted, for example, or to be more precise the rim or the surround concerned of that eyeglass frame, when the eyeglass frame has two rims or surrounds linked by a bridge.

However, it may equally well be a simple template, especially when there is no rim or surround, in an arrangement usually called a "drilled mount" in which the lenses are joined directly to each other by a bridge and each carries directly a base member to which a temple is hinged.

In this case it is necessary to drill at least two mounting holes in each lens, one for the bridge and the other for the base member of a temple.

In the conventional way, these mounting holes are at a given distance from the exterior contour of the lenses.

However, it is of course important that they are very accurately located at a specific position, identified beforehand.

To this end, the template has mounting holes in corresponding relationship in its peripheral area.

At present the position of these mounting holes is acquired more or less manually, and this is a relatively delicate and unreliable operation.

A general object of the present invention is an arrangement enabling this acquisition to be carried out in a particularly reliable and sure manner.

SUMMARY OF THE INVENTION

To be more precise, the present invention consists in a contour reading device, in particular for eyeglass frames, of the kind including holding means adapted to support a template at a fixed position and a carriage mobile relative to said holding means and carrying a feeler at the end of a rod, wherein, for reading off the position of a mounting hole in a peripheral area of said template, said device includes detector means having at least one component constrained to move with said carriage at a given distance from the axis of said rod carrying said feeler, on the same side as a central area of said holding means.

In practice this distance is equal to that between the edge of the template and the mounting hole(s) in the latter plus half the diameter of the rod carrying the feeler.

It is therefore sufficient for the contour of the template to be read off by applying the rod to the edge of the template so that, during movement, the component attached to the carriage detects the mounting hole(s) the position of which is to be identified.

This component is carried by the carriage, for example. Alternatively, it is carried by the feeler.

Alternatively, there is one component on the carriage and one on the feeler.

In all cases, the position of the mounting hole(s) is advantageously acquired during the reading off of the template contour, and can therefore be used immediately, in particular by presentation of the image of the template on a screen if the contour reading device is associated with a screen.

It can also be stored in memory, if required, and transmitted to one or more devices for trimming the lens and drilling the mounting holes at the same time as the shape of the eyeglass frame concerned.

BRIEF DESCRIPTION OF THE DRAWING

The features and advantages of the invention will emerge from the following description given by way of example only with reference to the accompanying diagrammatic drawing in which the single figure is a partial elevation view in section of a contour reading device in accordance with the invention.

DETAILED DESCRIPTION OF THE PREFERRED EMBODIMENTS

In the figure, only the components of the contour reading device necessary to an understanding of the invention have been shown.

Suffice to say that the contour reading device includes holding means 10 adapted to support a template 11 at a fixed station and a carriage 12 mobile relative to the holding means 10 carrying a feeler 14 at the end of a rod 13.

The holding means 10 are not in themselves relevant to the present invention and are not described in detail.

Suffice to say that, in the embodiment shown, they include a plate 15 carrying a block 16 to which the template 11 is attached and two arms 17 each of which has two fingers 18.

Either finger 18 on each of the arms 17 can be gripped between two support fingers 19A, 19B of the contour reading device, one of which is fixed and the other of which is mobile.

Holding means 10 of the above type are described, for example, in French patent application 94 15940 of 30 Dec. 1994 and, from this point of view, the description included in the above French patent application may be deemed to form an integral part of the present description.

The carriage 12 is not in itself part of the present invention either, and it is therefore not described in detail.

Only a very minor part of it is shown in the figure.

For a system using polar coordinates, for example, the carriage 12 is mobile in translation on a table rotatably mounted on a plate.

An arrangement of this type is described in U.S. Pat. No. 5,121,548 already mentioned hereinabove.

The rod 13 carrying the feeler 14 is orthogonal to the direction of translation of the carriage 12 and is mobile on the latter along its axis A. These arrangements do not constitute part of the present invention either.

In practice the rod 13 is a cylindrical shaft of circular cross-section at the end of which the feeler 14 is mounted to rotate about the axis A.

Finally, in a manner that is known in itself, the template 11 is in the general form of a plate the straight edge 20 of which is perpendicular to its main faces 21 and which has at least one mounting hole 22 in its peripheral area, at a distance $D_1$ from its edge 20.

In accordance with the invention, to read off the positions of the mounting hole 22, the contour reading device is provided with detector means 24 having at least one component 25 constrained to move with the carriage 12 by arrangements described in more detail below at a given distance $D_2$ from the axis A of the rod 13 carrying the feeler 14, on the same side as the central area of the means 10 for holding the template 11.

For example, the component 25 is a transmitter-receiver carried by the carriage 12 and facing towards the holding means 10.

In use, the exterior surface of the rod 13 carrying the feeler 14 is pressed against the edge 20 of the template 11, as shown in the figure.

Let $D_3$ be the diameter of the rod 13.

By construction:

$$D_2 = D_1 + 0.5\, D_3$$

If the radiation emitted by the component 25 is reflected sufficiently from the template 11 to obtain a correct (i.e. usable) return signal, the component 25 may be used on its own.

When this radiation passes through the mounting hole 22, the return signal disappears, which is sufficient to identify the position of the mounting hole 22.

On the other hand, if the radiation emitted by the component 25 is insufficiently reflected from the template 11, the feeler 14 carries a mirror 26 vertically aligned with the component 25, as shown in the figure.

Because of the mirror 26, the component 25 receives, when the mounting hole 22 moves past it, a sufficient return signal which, as previously, is sufficient for identifying the position of the mounting hole 22.

In either case, the operator can mark the mounting holes 22 in the template 11 successively on the associated screen (not shown).

This may be effected using mobile cross-hairs, for example.

It may instead be effected using a cursor of the type controlled by a "mouse" on a computer.

Each time, the corresponding reading is stored in memory.

To this end, the device of the invention includes memory means.

It also includes transmission means for transferring the position of the mounting holes acquired in the manner described above to one or more trimming and mounting hole drilling devices, for example at the same time as the reading relating to the shape of the eyeglass frame concerned.

These memory and transmission means are known in themselves and familiar to the person skilled in the art, so they are not described here.

. The present invention is not limited to the embodiment described and shown, but encompasses any variant execution thereof.

In particular, instead of being carried by the carriage, the transmitter-receiver attached to the latter may be carried by the feeler.

Alternatively, either the carriage or the feeler may carry a component constituting an emitter while the other of them carries a component constituting a receiver.

In all cases, carried by the carriage either directly or indirectly, the component(s) used are constrained to move with the latter.

There is claimed:

1. In a contour reading device especially for rimless eyeglass frames, the reading device comprising holding means having a central and a peripheral area and adapted to support a lens contour template at a fixed position and a carriage mobil relative to said holding means and carrying a rod having an axis and a feeler at a distal end of the rod, and means for reading the contour of the template, the invention comprising mounting hole reading means for reading off the position of a lens mounting hole in a peripheral area of the lens contour template, said mounting hole reading means including detector means having a component constrained to move with said carriage spaced from said rod axis at a predetermined distance, said mounting hole reading means being located on the same side of said central area as said holding means.

2. The invention as claimed in claim 1, wherein said component comprises a transmitter-receiver carried by said carriage and facing the lens contour template and spaced from the contour edge thereof.

3. The invention as claimed in claim 2, wherein said feeler comprises a mirror vertically aligned with said transmitter-receiver and on the opposite side of the template in relation to said transmitter-receiver.

4. The invention as claimed in claim 1, further comprising memory means for storing the position of the detected mounting hole and transmission means for transferring the stored position of the mounting hole to mounting hole drilling means.

5. The invention as claimed in claim 1, wherein said means for reading the contour of the template is defined by a portion of the rod at a location axially spaced from the component constrained to move with carriage.

6. In a contour reading device especially for rimless eyeglass frames, the reading device comprising holding means having a central and a peripheral area and adapted to support a lens contour template at a fixed position and a carriage mobile relative to said holding means and carrying a rod having an axis and a feeler at a distal end of the rod, means for reading the contour of the template, the invention comprising mounting hole reading means for reading off the position of a lens mounting hole in a peripheral area of the lens contour template, said mounting hole reading means including detector means having a component constrained to move with said carriage spaced from said rod axis at a predetermined distance, said detector means having a detection direction generally parallel to said rod axis, said predetermined distance being equal to the distance between an edge of the template and said mounting hole plus one half the diameter of said rod.

7. The invention as claimed in claim 6, wherein said component comprises a transmitter-receiver carried by said carriage and facing the lens contour template and spaced from the contour edge thereof.

8. The invention as claimed in claim 7, wherein said feeler comprises a mirror vertically aligned with said transmitter-receiver.

9. The invention as claimed in claim 6, further comprising memory means for storing the read off position of the mounting hole and transmission means for transferring the stored read off position of the mounting hole to mounting hole drilling means.

10. The invention as claimed in claim 6, wherein said means for reading the contour of the template is defined by a portion of the rod at a location axially spaced from the component constrained to move with carriage.

11. A mounting hole reading device especially for rimless eyeglass frames, comprising holding means having a central and a peripheral area and adapted to support a lens contour template at a fixed position and a carriage mobile relative to said holding means and carrying a rod having an axis and a feeler at a distal end of the rod, the mounting hole reading device including detector means having a component constrained to move with said carriage spaced from said rod axis at a predetermined distance, said detector means having a detection direction generally parallel to said axis of said rod for reading off the position of the mounting hole at said predetermined distance from the template edge.

12. The invention as claimed in claim 11, wherein said component comprises a transmitter-receiver carried by said carriage and facing the lens contour template and spaced from the contour edge thereof.

13. The invention as claimed in claim 12, wherein said feeler comprises a mirror vertically aligned with said transmitter-receiver.

14. The invention as claimed in claim 11, further comprising memory means for storing the position of the detected mounting hole and transmission means for transferring the stored position of the mounting hole to mounting hole drilling means.

15. The invention as claimed in claim 11, wherein said predetermined distance being equal to the distance between an edge of the template and said mounting hole plus one half the diameter of said rod.

* * * * *